US012585974B2

(12) United States Patent　　　　　(10) Patent No.: US 12,585,974 B2
McEwen et al.　　　　　　　　　　　(45) Date of Patent: Mar. 24, 2026

(54) QUANTUM CIRCUITS FOR MOVING A SURFACE CODE PATCH

(71) Applicant: Google LLC, Mountain View, CA (US)

(72) Inventors: Matthew James McEwen, Santa Barbara, CA (US); Craig Gidney, Goleta, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 18/495,547

(22) Filed: Oct. 26, 2023

(65) Prior Publication Data

US 2024/0144069 A1 May 2, 2024

Related U.S. Application Data

(60) Provisional application No. 63/420,432, filed on Oct. 28, 2022.

(51) Int. Cl.
*G06N 5/00* (2023.01)
*G06N 10/40* (2022.01)
*G06N 10/70* (2022.01)

(52) U.S. Cl.
CPC ............. *G06N 10/70* (2022.01); *G06N 10/40* (2022.01)

(58) Field of Classification Search
None
See application file for complete search history.

(56) References Cited

U.S. PATENT DOCUMENTS

| | | | | |
|---|---|---|---|---|
| 11,437,995 | B1 | 9/2022 | Haah et al. | |
| 11,900,221 | B1 * | 2/2024 | Chamberland | ........ G06N 10/60 |
| 12,008,438 | B1 * | 6/2024 | Chamberland | ........ G06N 10/70 |
| 12,057,859 | B1 * | 8/2024 | Chamberland | ......... G06F 11/10 |
| 2021/0117845 | A1 * | 4/2021 | Choi | ...................... G06N 10/40 |
| 2022/0253738 | A1 * | 8/2022 | Ichimura | ................ G06N 10/40 |
| 2022/0278683 | A1 * | 9/2022 | Haah | .................... H03K 19/195 |

OTHER PUBLICATIONS

Aaronson et al., "Improved simulation of stabilizer circuits" CoRR, Submitted on Jun. 2008, arXiv:quant-ph/0406196v5, 15 pages.
Aaronson, "Introduction to Quantum Information Science II Lecture Notes" May 2022, 155 pages.

(Continued)

*Primary Examiner* — Mujtaba M Chaudry
(74) *Attorney, Agent, or Firm* — Fish & Richardson P.C.

(57) ABSTRACT

Methods, systems, and apparatus for implementing a quantum circuit that moves a surface code patch of qubits. In one aspect, a method includes performing a first surface code cycle in a system of measure and data qubits. A first CNOT gate is applied to a measure qubit and a first data qubit, where the first data qubit is coupled to the measure qubit in a first direction and the first CNOT gate targets one of the measure qubits and the first data qubit. A second CNOT gate is applied to the measure qubit and the first data qubit, where the second CNOT gate targets another of the measure qubit and the first data qubit. Performing the first surface code cycle transfers information stored by the measure qubit and information stored by the first data qubit to other qubits to logically move the measure qubit and the first data qubit.

20 Claims, 9 Drawing Sheets

(56)                References Cited

OTHER PUBLICATIONS

Aasen et al., "Adiabatic paths of Hamiltonians, symmetries of topological order, and automorphism codes" Physical Review B 106.8, Aug. 2022, 19 pages.

Arute et al., "Quantum supremacy using a programmable superconducting processor" Nature 574.7779, Oct. 2019, 505-510.

Ataides et al., "The XZZX surface code". Nature communications, 12(1), 2172, Apr. 12, 2021, 12 pages.

Bacon, "Operator Quantum Error Correcting Subsystems for Self-Correcting Quantum Memories" CoRR, Submitted on Jul. 2005, arXiv:quant-ph/0506023v4, 17 pages.

Baspin et al., "Connectivity constrains quantum codes" CoRR, Submitted on Apr. 2022, arXiv:2106.00765v4, 26 pages.

Battistel et al., "Hardware-Efficient Leakage-Reduction Scheme for Quantum Error Correction with Superconducting Transmon Qubits" PRX Quantum 2.3, Jul. 26, 2021, 030314:1-23.

Bombin et al. "Logical blocks for fault-tolerant topological quantum computation" CoRR, Submitted on Dec. 2021, arXiv:2112:12160v1, 34 pages.

Bombin et al., "Optimal resources for topological two-dimensional stabilizer codes: Comparative study" CoRR, Submitted on Mar. 2007, arXiv:quant-ph/0703272v1, 6 pages.

Bombin et al., "Unifying flavors of fault tolerance with the ZX calculus" CoRR, Submitted on Nov. 2023, arXiv:2303.08829v2, 16 pages.

Bombín, "Single-shot fault-tolerant quantum error correction." Physical Review X 5.3, Sep. 28, 2015, 031043:1-26.

Bravyi et al., "Quantum codes on a lattice with boundary" CoRR, Submitted on Nov. 1998, arXiv:quant-ph/9811052v1, 6 pages.

Bravyi et al., "Subsystem surface codes with three-qubit check operators" CoRR, Submitted on Dec. 2013, arXiv:1207.1443v2, 13 pages.

Bravyi et al., "Universal quantum computation with ideal Clifford gates and noisy ancillas" CoRR, Submitted on Dec. 2004, arXiv:quant-ph/0403025v2, 15 pages.

Breuckmann et al., "Quantum low-density parity-check codes." PRX Quantum 2.4, Oct. 2021, 040101-21.

Breuckmann et al., "Balanced Product Quantum Codes" CoRR, Submitted on Jul. 2021, arXiv:2012.09271v3, 23 pages.

Brown et al., "Leakage mitigation for quantum error correction using a mixed qbit scheme" Phys. Rev. A, 100(3), Sep. 18, 2019, 9 pages.

Calderbank et al., "Good quantum error-correcting codes exist." CoRR, Submitted on Apr. 1996, arXiv:quant-ph/9512032v2, 24 pages.

Chamberland et al., "Topological and subsystem codes on low-degree graphs with flag qubits." Physical Review X 10.1, Jan. 31, 2020, 011022:1-19.

Chamberland et al., "Fault-tolerant magic state preparation with flag qubits" CoRR, Submitted on May 2019, arXiv:1811.00566v2, 26 pages.

Chao et al., "Flag fault-tolerant error correction for any stabilizer code." PRX Quantum 1.1, Sep. 3, 2020, 010302:1-6.

Chao et al., "Quantum Error Correction with Only Two Extra Qubits" Physical review letters 121.5, Aug. 2018, 6 pages.

Chen et al., "Measuring and Suppressing Quantum State Leakage in a Superconducting Qubit" Physical review letters 116.2, Jan. 13, 2016, 5 pages.

Córcoles et al., "Process verification of two-qubit quantum gates by randomized benchmarking." CoRR, Submitted on Nov. 2012, arXiv:1210.7011v2, 9 pages.

Delfosse et al., "Spacetime codes of Clifford circuits." CoRR, Submitted on May 2023, arXiv:2304.05943v2, 33 pages.

Dennis et al., "Topological quantum memory." CoRR, Submitted on Oct. 2001, arXiv:quant-ph/0110143v1, 39 pages.

DiVincenzo et al., "Multi-qubit parity measurement in circuit quantum electrodynamics." New journal of physics 15.7, Jul. 2, 2013, 18 pages.

Fowler et al., "Surface codes: Towards practical large-scale quantum computation" CoRR, Submitted on Aug. 2012, arXiv:1208.0928v1, 54 pages.

Fowler, "Coping with qubit leakge in topological codes" CoRR, Submitted on Aug. 2013, arXiv: 1308.6642v1, 5 pages.

Fowler, "Optimal complexity correction of correlated errors in the surface code" CoRR, Submitted on Oct. 2013, arXiv:1310.0863v1, 6 pages.

Foxen et al., "Demonstrating a Continuous Set of Two-qubit Gates for Near-term Quantum Algorithms" Physical Review Letters 125.12, Sep. 15, 2020, 120504:1-6.

Fujiwara "Ability of stabilizer quantum error correction to protect itself from its own imperfection" CoRR, Submitted on Dec. 2014, arXiv:1409:2559v4, 9 pages.

Ghosh et al., "Understanding the effects of leakage in superconducting quantum error detection circuits." CoRR, Submitted on Dec. 2013, arXiv:1306.0925v2, 8 pages.

Ghosh et al., "Leakage-resilient approach to fault-tolerant quantum computing with superconducting elements" Physical Review A 91.2, Feb. 20, 2015, 6 pages.

Gidney et al., "How to factor 2048 bit RSA integers in 8 hours using 20 million noisy qubits." CoRR, Submitted on Apr. 2021, arXiv:1905.09749v3, 31 pages.

Gidney et al., "Benchmarking the Planar Honeycomb Code" CoRR, Submitted on Sep. 2022, arXiv:2202:11845v3, 18 pages.

Gidney, "A pair measurement surface code on pentagons." CoRR, Submitted on Oct. 2023, arXiv:2206.12780v2, 15 pages.

Gidney, "Stim: a fast stabilizer circuit simulator" CoRR, Submitted on Jun. 2021, arXiv:2103.02202v3, 26 pages.

Google Quantum AI et al., "Exponential suppression of bit or phase errors with cyclic error correction." Nature 595, No. 7867, Jul. 2021, 383-387.

Google Quantum AI et al., "Suppressing quantum errors by scaling a surface code logical qubit" Nature 614, No. 7949, Feb. 2023, 676-681.

Gottesman, "Opportunities and Challenges in Fault-Tolerant Quantum Computation" CoRR, Submitted on Oct. 2022, arXiv:2210.15844v1, 24 pages.

Gottesman, "Stabilizer Codes and Quantum Error Correction" CoRR, Submitted on May 1997, arXiv:quant-ph/9705052v1, 122 pages.

Gottesman, "The Heisenberg Representation of Quantum Computers" CoRR, Submitted on Jul. 1998, arXiv:quant-ph/9807006v1, 20 pages.

Haah et al., "Boundaries for the Honeycomb Code" CoRR, Submitted on Apr. 2022, arXiv:2110.09545v2, 12 pages.

Hastings et al., "Dynamically Generated Logical Qubits" CoRR, Submitted on Oct. 2021, arXiv:2107.02194v2, 19 pages.

Higgott, "PyMatching: A Python package for decoding quantum codes with minimum-weight perfect matching" CoRR, Submitted on Jul. 2021, arXiv:2105.13082v2, 15 pages.

Horsman et al., "Surface code quantum computing by lattice surgery" New Journal of Physics 14.12, Dec. 2012, 123011:1-27.

Khaneja et al., "Cartan Decomposition of SU (2 n), Constructive Controllability of Spin systems and Universal Quantum Computing" CoRR, Submitted on Oct. 2000, arXiv:quant-ph/0010100v1, 17 pages.

Kitaev et al., "Fault-tolerant quantum computation by anyons". CoRR, Submitted on Jul. 1997, arXiv:quant-ph/9707021v1, 27 pages.

Krinner et al., "Realizing repeated quantum error correction in a distancethree surface code" CoRR, Submitted on Dec. 2021, arXiv:2112.03708v1, 28 pages.

Lalumière et al., "Tunable joint measurements in the dispersive regime of cavity QED" CoRR, Submitted on Apr. 2010, arXiv:0911.5322v2, 4 pages.

Livingston et al., "Experimental demonstration of continuous quantum error correction". In: Nature Communications 13.1, Apr. 2022, 7 pages.

Magnard et al., "Fast and unconditional all-microwave reset of a superconducting qubit." Physical review letters 121.6, Aug. 2018, 6 pages.

McEwen et al., "Relaxing Hardware Requirements for Surface Code Circuits using Time-dynamics" CoRR, Submitted on Sep. 2023, arXiv:2302.02192v2, 55 pages.

(56)          References Cited

OTHER PUBLICATIONS

McEwen et al., "Removing leakage-induced correlated errors in superconducting quantum error correction" Nature communications 12.1, Mar. 2021, 7 pages.

Miao et al., "Overcoming leakage in scalable quantum error correction" CoRR, Submitted on Nov. 2022, arXiv:2211.04728v1, 17 pages.

Mølmer et al., "Multi-particle Entanglement of Hot Trapped Ions" CoRR, Submitted on Jan. 1999, arXiv:quant-ph/9810040v2, 4 pages.

Motzoi et al., "Simple Pulses for Elimination of Leakage in Weakly Nonlinear Qubits" CoRR, Submitted on Oct. 2009, arXiv:0901.0534v3, 4 pages.

Paetznick et al., "Performance of planar floquet codes with majorana-based qubits." PRX Quantum 4.1, Jan. 2023, 010310:1-15.

Panteleev et al., "Asymptotically Good Quantum and Locally Testable Classical LDPC Codes" CoRR, Submitted on Jan. 2022, arXiv:2111.03654v2, 51 pages.

Paraoanu, "Microwave-induced coupling of superconducting qubits" CoRR, Submitted on Jan. 2008, arXiv:0801.4541v2, 6 pages.

Raussendorf et al., "A fault-tolerant one-way quantum computer" CoRR, Submitted on Oct. 2005, arXiv:quant-ph/0510135v1, 26 pages.

Reagor et al., "Hardware optimized parity check gates for superconducting surface codes" CoRR, Submitted on Nov. 2022, arXiv:2211.06382v1, 21 pages.

Rigetti et al., "Fully microwave-tunable universal gates in superconducting qubits with linear couplings and fixed transition frequencies." Physical Review B 81.13, Apr. 2010, 134507:1-7.

Roffe et al., "Bias-tailored quantum LDPC codes" CoRR, Submitted on May 2023, arXiv:2202.01702v3, 22 pages.

Royer et al., "Qubit parity measurement by parametric driving in circuit QED" In: Science Advances 4.11, Nov. 2018, 7 pags.

Shor, "Scheme for reducing decoherence in quantum computer memory" In Physical Review A 52.4, Oct. 1995, R2493-2496.

Steane, "Multiple-particle interference and quantum error correction" CoRR, Submitted on May 1996, arXiv:quant-ph/9601029v3, 45 pages.

Sundaresan et al., "Matching and maximum likelihood decoding of a multiround subsystem quantum error correction experiment" CoRR, Submitted on Apr. 2022, arXiv:2203.07205v2, 15 pages.

Tucci, "An Introduction to Cartan's KAK Decomposition for QC Programmers" CoRR, Submitted on Jul. 2005, arXiv:quant-ph/0507171v1, 12 pages.

Tuckett et al., "Tailoring surface codes for highly biased noise." Physical Review X 9.4, 2019, 041031:1-22.

Wen, "Quantum Orders in an Exact Soluble Model" CoRR, Submitted on Aug. 2002, arXiv:quant-ph/0205004v3, 4 pages.

Yan et al. "A Tunable Coupling Scheme for Implementing High-Fidelity Two-Qubit Gates". In: Physical Review Applied 10.5, Nov. 2018, 9 pages.

Zhou et al., "Rapid and unconditional parametric reset protocol for tunable superconducting qubits." Nature Communications 12.1, Oct. 2021, 8 pages.

International Search Report and Written Opinion in International Appln. No. PCT/US2023/035785, mailed on May 13, 2025, 17 pages.

International Preliminary Report on Patentability in International Appln. No. PCT/US2023/035785, mailed on May 22, 2025, 10 pages.

\* cited by examiner

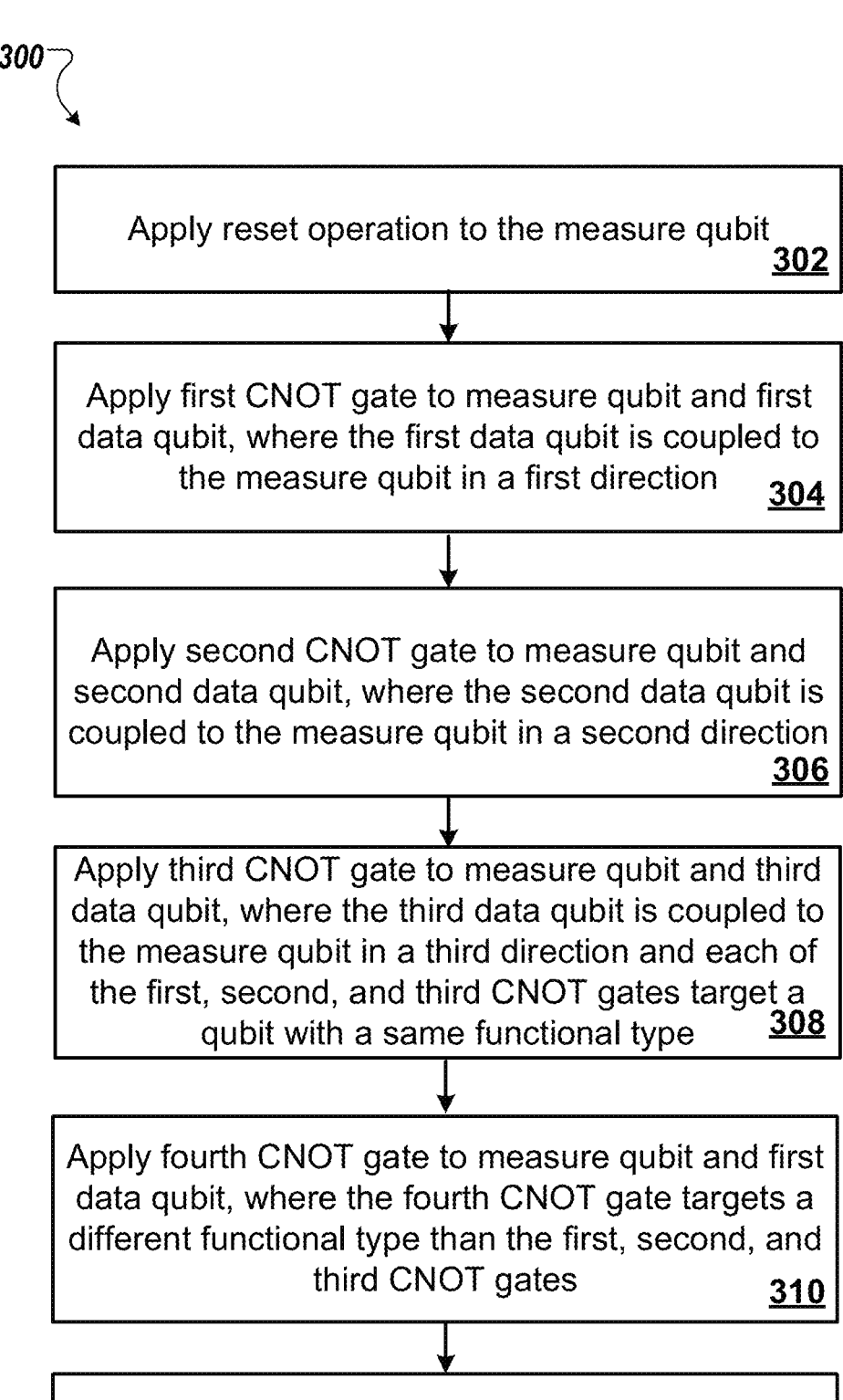

300

Apply reset operation to the measure qubit 302

Apply first CNOT gate to measure qubit and first data qubit, where the first data qubit is coupled to the measure qubit in a first direction 304

Apply second CNOT gate to measure qubit and second data qubit, where the second data qubit is coupled to the measure qubit in a second direction 306

Apply third CNOT gate to measure qubit and third data qubit, where the third data qubit is coupled to the measure qubit in a third direction and each of the first, second, and third CNOT gates target a qubit with a same functional type 308

Apply fourth CNOT gate to measure qubit and first data qubit, where the fourth CNOT gate targets a different functional type than the first, second, and third CNOT gates 310

Measure first data qubit to obtain measurement results for error detection 312

FIG. 3

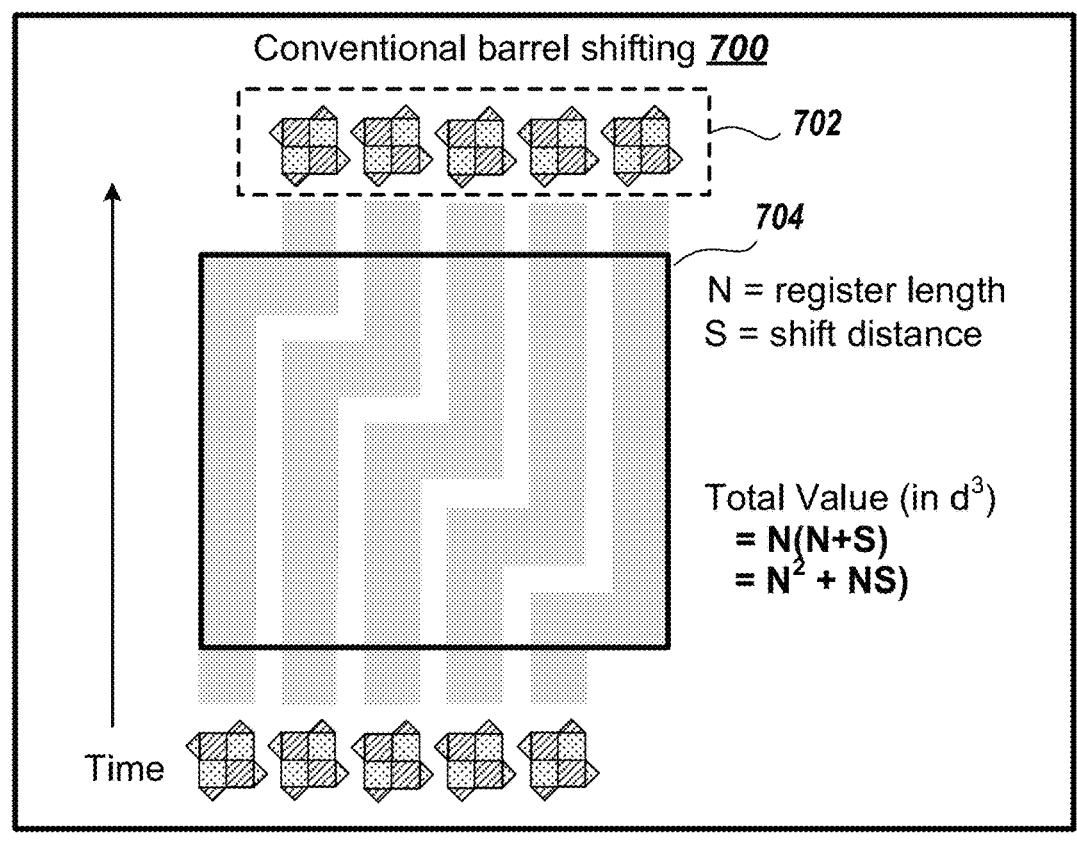
Conventional barrel shifting 700
702
704
N = register length
S = shift distance
Total Value (in d$^3$)
   = N(N+S)
   = N$^2$ + NS)
Time
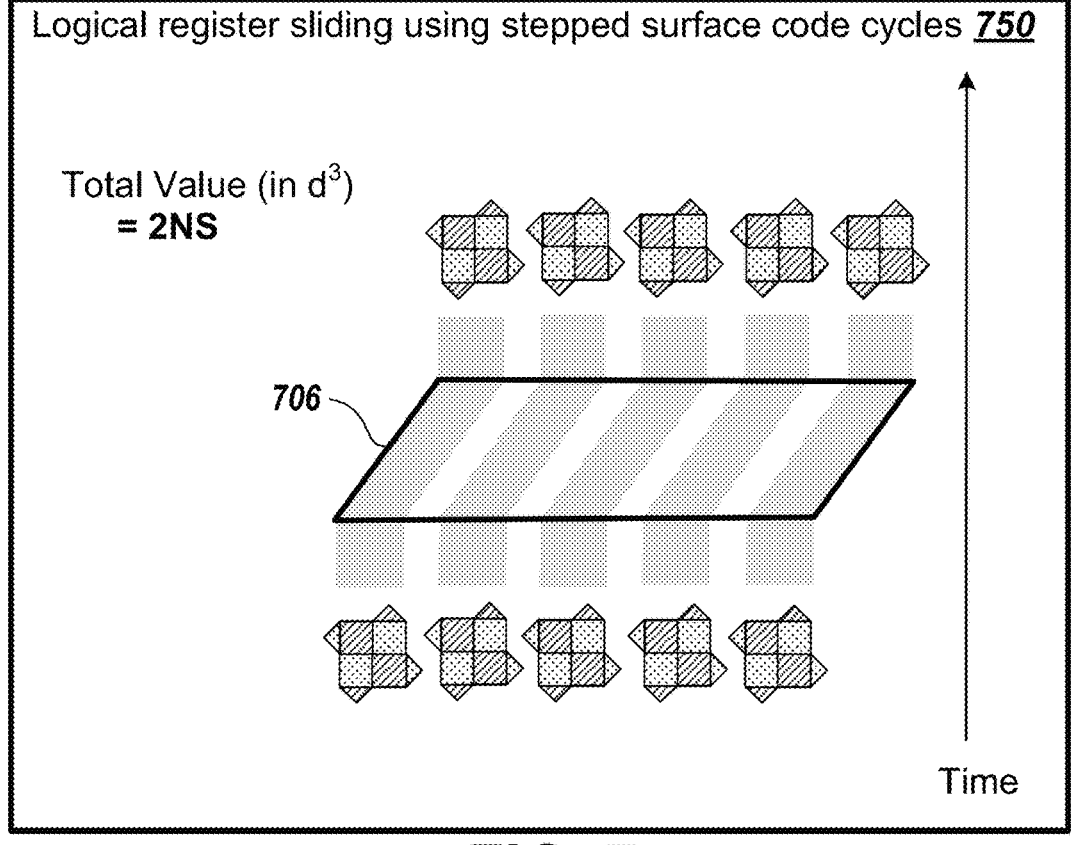
Logical register sliding using stepped surface code cycles 750
Total Value (in d$^3$)
   = 2NS
706
Time
FIG. 7

QUANTUM CIRCUITS FOR MOVING A SURFACE CODE PATCH

CROSS-REFERENCE TO RELATED APPLICATIONS

This application claims the benefit under 35 U.S.C. § 119(e) of U.S. Patent Application No. 63/420,432, filed Oct. 28, 2022. The disclosure of the foregoing application is incorporated herein by reference in its entirety for all purposes.

BACKGROUND

This specification relates to quantum computing.

Quantum computing provides a means to solve certain problems that cannot be solved in a reasonable period of time using conventional classical computers. These problems include factoring very large numbers into their primes and searching large, unstructured data sets. A number of physical systems are being explored for their use in quantum computing, including ions, spins in semiconductors, and superconducting circuits. However, none of these systems perform sufficiently well to serve directly as computational qubits. For example, single two-state physical systems, which can be used as physical qubits, cannot reliably encode and retain information for long enough to be useful.

Therefore, scalable quantum computers require quantum error correction. Classical error correction employs redundancy. For example, in the repetition code information is copied and stored multiple times. If the copies are later found to disagree, it can be determined that an error has occurred, and a majority vote can be taken to recover the information. Copying quantum information is not possible due to the no-cloning theorem. Therefore, quantum error correction codes spread the logical information of one qubit onto an entangled state of multiple physical qubits. The multiple physical qubits are collectively referred to as a logical qubit.

Surface codes are a family of quantum error correcting codes that are defined on a two-dimensional lattice of qubits. In the surface code, physical qubits are entangled using a sequence of physical qubit CNOT operations, with subsequent measurements of the entangled states providing a means for error correction and error detection. A set of physical qubits entangled in this way is used to define a logical qubit, which due to the entanglement and measurement has far better performance than the underlying physical qubits. One of the significant advantages of surface codes is their relative tolerance to local errors. Surface codes can handle error rates of almost 3% per surface code clock cycle, which is far less stringent than that of other quantum computing approaches. This error tolerance, along with the simple two-dimensional qubit layout, makes a surface code architecture a realistic approach to building a solid-state quantum computer.

SUMMARY

This specification describes technologies for implementing quantum circuits that logically move a surface code patch of qubits.

One innovative aspect of the subject matter described in this specification can be implemented in a method performed by a quantum computer, the method including performing a first surface code cycle in a system comprising a plurality of qubits, wherein each qubit in the plurality of qubits is one of two functional types, the two functional types comprising measure qubits and data qubits, wherein performing the first surface code cycle comprises: applying a first controlled NOT (CNOT) gate to the measure qubit and a first data qubit, wherein the first data qubit is coupled to the measure qubit in a first direction and the first CNOT gate targets one of the measure qubit and the first data qubit; and applying a second CNOT gate to the measure qubit and the first data qubit, wherein the second CNOT gate targets another of the measure qubit and the first data qubit; wherein performing the first surface code cycle transfers information stored by the measure qubit and information stored by the first data qubit to other qubits in the plurality of qubits to logically moves the measure qubit and the first data qubit.

Other implementations of these aspects include corresponding computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the measure qubit and first data qubit are logically moved such that the functional type of the measure qubit and first data qubit is exchanged.

In some implementations performing the first surface code cycle further comprises: applying a third CNOT gate to the measure qubit and a second data qubit, wherein the second data qubit is coupled to the measure qubit in a second direction that is different to the first direction; applying a fourth CNOT gate to the measure qubit and a third data qubit, wherein the third data qubit is coupled to the measure qubit in a third direction that is different to both the first direction and the second direction, wherein each of the first CNOT gate, third CNOT gate, and fourth CNOT gate targets a qubit with a same functional type.

In some implementations performing the first surface code cycle transfers information stored by the measure qubit, first data qubit, second data qubit, third data qubit, and fourth data qubit to other qubits in the plurality of qubits to logically moves the measure qubit, first data qubit, second data qubit, third data qubit, and fourth data qubit such that the functional type of each of the measure qubit, first data qubit, second data qubit, third data qubit, and fourth data qubit is exchanged.

In some implementations performing the first surface code cycle further comprises: prior to applying the first CNOT gate, applying a reset operation to a measure qubit in the system, wherein the measure qubit is coupled to neighboring data qubits through respective qubit couplers; and after applying the second CNOT gate, measuring the first data qubit to detect errors.

In some implementations performing the first surface code cycle removes measure qubit leakage.

In some implementations the plurality of qubits are arranged as a two-dimensional grid and wherein performing the first surface code cycle logically moves the measure qubit and the first data qubit diagonally by one grid cell in the two-dimensional grid.

In some implementations the measure qubit and the first data qubit are moved collectively and in a same direction, wherein the same direction is dependent on the first direction.

In some implementations performing the first surface code cycle, the measure qubit and the first data qubit are at an initial position in the two-dimensional grid, and wherein the method further comprises performing a second surface code cycle to logically return the measure qubit and the first data qubit to the initial position.

In some implementations performing the second surface code cycle removes data qubit leakage.

In some implementations the method further comprises performing multiple repetitions of the first surface code cycle to logically move the measure qubit and the first data qubit diagonally by multiple grid cells in the two-dimensional grid.

In some implementations the measure qubit and the first data qubit are moved collectively and in a same direction, wherein the same direction is dependent on the first direction.

In some implementations the method further comprises performing multiple subsequent surface code cycles to logically move the measure qubit and the first data qubit laterally by multiple grid cells in the two-dimensional grid.

In some implementations logically moving the measure qubit and the first data qubit laterally by multiple grid cells comprises alternating performing the first surface code cycle to collectively move the measure qubit and the first data qubit in a first diagonal direction and a second surface code cycle to collectively move the measure qubit and the first data qubit in a second diagonal direction that is perpendicular to the first diagonal direction.

In some implementations the measure qubit, first data qubit, second data qubit, third data qubit, and fourth data qubit form a respective stabilizer in a logical qubit, the logical qubit comprising multiple stabilizers, and wherein the method further comprises performing the first surface code cycle on each of the multiple stabilizers.

In some implementations the method further comprises: for each stabilizer at a boundary that the code patch is moving away from, measuring the stabilizer; and introducing new stabilizers at a boundary that the code patch is moving towards, wherein the new stabilizers preserve the surface code structure.

In some implementations the system comprises a register of logical qubits, and wherein the method further comprises performing multiple subsequent surface code cycles to each stabilizer in each logical qubit in the register to logically shift the register in the two-dimensional grid.

In some implementations i) the measure qubit is a measure-Z qubit, ii) the first CNOT gate, third CNOT gate, and fourth CNOT gate target the measure qubit, and iii) the second CNOT gate targets the first data qubit.

In some implementations i) the measure qubit is a measure-X qubit, ii) the first CNOT gate, third CNOT gate, and fourth CNOT gate target the first data qubit, second data qubit, and third data qubit, respectively, and iii) the second CNOT gate targets the measure qubit.

The subject matter described in this specification can be implemented in particular ways so as to realize one or more of the following advantages.

In quantum computing operations are typically performed on qubits in the computational basis, e.g., between the zero- and one-excitation manifold. However, since physical qubits are not perfect two-level systems and there are higher energy levels corresponding to additional excitations, there is a probability of leaving the computational basis and entering those higher states. This process is referred to as leakage. Leakage can introduce errors into quantum computations. In particular, leakage is troublesome for quantum error correction as it can induce correlated errors, breaking a fundamental assumption of error correction.

Some existing techniques remove leakage by resetting the qubit, however this also results in the destruction of the quantum information encoded in the computational basis. These techniques can improve quantum error correction performance since it can be applied to measure qubits, which only encode temporary information at each round and can be reset. However, this is incompatible with data qubits in quantum error correction since data qubits must maintain the encoded state at all times. Other existing techniques add additional operations to the surface code circuit to remove leakage, which take additional time and induce additional errors which must then be corrected.

A system implementing the presently described surface code circuits can remove both measure qubit and data qubit leakage without increasing the surface code spacetime volume, e.g., without adding any additional operations to the surface code circuits and without growing the surface code patch. This leakage removal is achieved without affecting the surface code performance, that is the functionality of the surface code and its ability to detect errors is preserved.

In addition, the presently described surface code circuits can be used to logically move surface code patches through an array of qubits. Moving a surface code patch permits more compact implementations of logical operations on many logical qubit patches simultaneously, reducing the overall spacetime volume necessary to perform quantum algorithms.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for performing a stepped surface code cycle.

FIG. 7 illustrates an application of the presently described quantum circuit construction to shifting a register of logical qubits.

Like reference numbers and designations in the various drawings indicate like elements.

DETAILED DESCRIPTION

This specification describes surface code circuit decompositions that allow for the movement of a surface code patch and data qubit leakage removal without adding any additional gate layers to the surface code circuit. Throughout the specification, the term "moving" a surface code patch of qubits refers to moving or transferring information stored by an initial surface code patch to another patch of qubits, where the other patch of qubits can overlap the initial surface code patch, and not to physically moving qubits.

Figure 1:
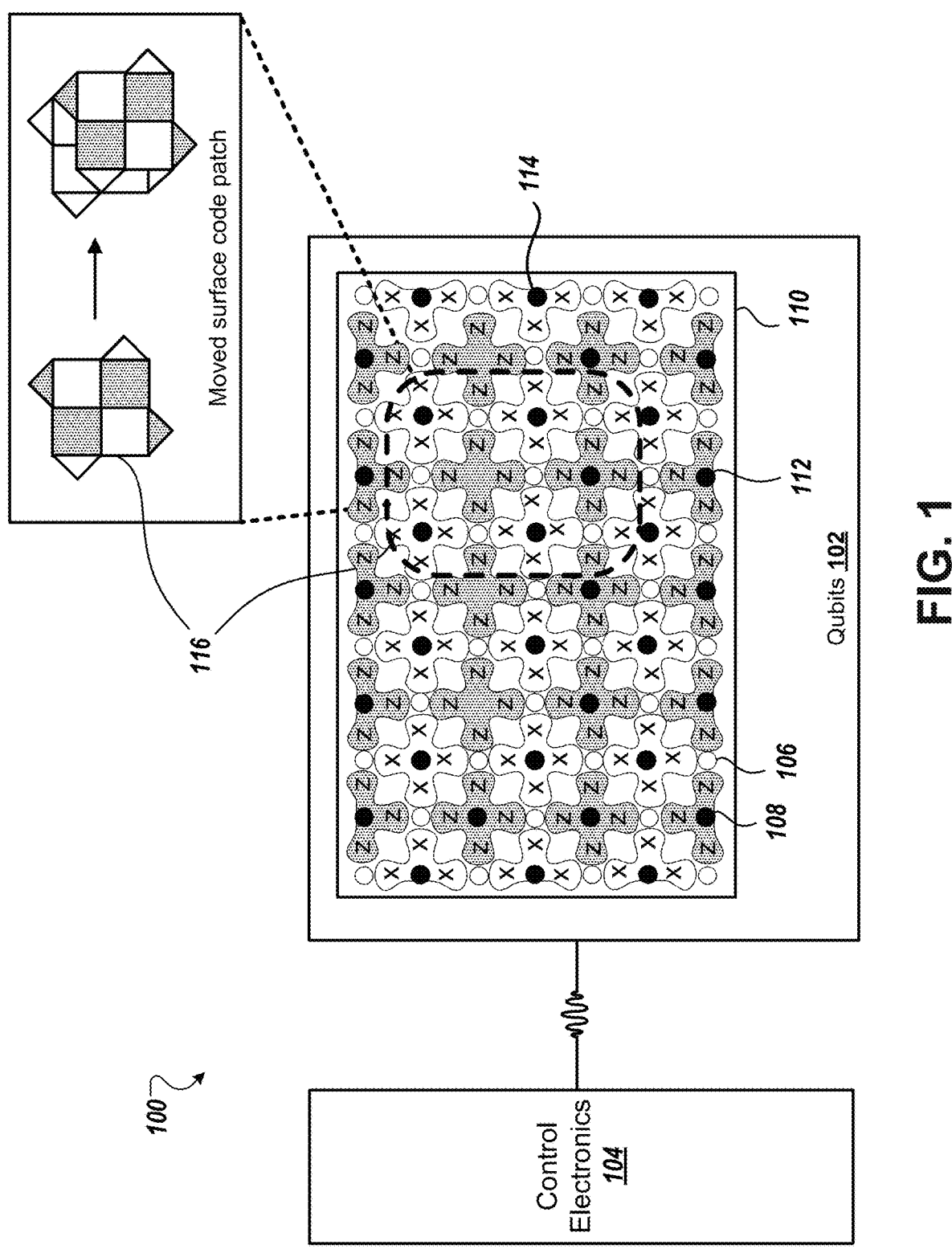
FIG. 1 is a block diagram of an example system for implementing a surface code.

FIG. 1 is a block diagram of an example system 100 for implementing a surface code. The example system 100 is an example of a system implemented as part of a quantum computing device in which the systems, components and techniques described in this specification can be implemented.

The system 100 includes multiple qubits 102 in communication with control electronics 104. The qubits 102 are physical qubits, e.g., physical devices that behave as a two-state quantum system. Each qubit in the of the qubits 102 can have one of two functional types: data qubits and measure qubits. For example, the qubits 102 include qubits that act as data qubits, e.g., qubit 106. A data qubit, e.g., qubit 106, is a qubit that participates in quantum computations performed by the system 100 and stores quantum information corresponding to the quantum computations. That is, the state of the data qubit encodes logical information for a quantum computation.

As another example, the qubits 102 include qubits that act as measure qubits, e.g., qubit 108. A measure qubit is a qubit that is used to determine an outcome of a computation performed by the data qubit. For example, during a computation, an unknown state of the data qubit can be entangled with the state of the measure qubit using a suitable physical operation, after which the measure qubit can be measured. In the example shown in FIG. 1, the measure qubits can include measure-Z qubits, e.g., measure qubit 112, and measure-X qubits, e.g., measure qubit 114. Each data qubit is coupled to one or two measure-Z qubits and to one or two measure-X qubits (depending on whether the data qubit is at the boundary or in the bulk). Each measurement qubit is coupled to three or four data qubits (depending on whether the measure qubit is at the boundary or in the bulk). A measure-Z qubit is a qubit that can be used to force its neighboring data qubits a, b, c and d into an eigenstate of the operator product $\hat{Z}_a\hat{Z}_b\hat{Z}_c\hat{Z}_d$ where $\hat{Z}_a$ represents a Pauli-Z operator acting on qubit a. Each measure-Z qubit therefore measures a $\hat{Z}$ stabilizer, as indicated in FIG. 1 by the shading around each measure-Z qubit. A measure-X qubit is a qubit that can be used to force its neighboring data qubits a, b, c and d into an eigenstate of the operator product $\hat{X}_a\hat{X}_b\hat{X}_c\hat{X}_d$ where $\hat{X}_a$ represents a Pauli-X operator acting on qubit a. Each measure-X qubit therefore measures a $\hat{X}$ stabilizer, as indicated by the shading around each measure-X qubit.

Each of the qubits 102 can be in a respective quantum state that occupies one or more levels. The levels include two computational levels, e.g., levels 0- and 1-, and one or more non-computational levels that are each higher than the computational qubit levels, e.g., levels 2- and 3-. Population of the higher, non-computational qubit levels can introduce errors in algorithmic operations or quantum computations performed using the qubit. For example, the occupation of qubit levels outside the computational subspace can hamper or prevent the implementation of quantum error correction operations.

In some implementations the multiple qubits 102 can be superconducting qubits or semiconducting qubits. For example, the qubits 102 can include Xmon qubits, flux qubits, phase qubits, or qubits with frequency interactions. Generally, the qubits 102 are physical devices that are configured to meet basic requirements for quantum computation. For example, the qubits 102 include physical devices that can be initialized, can perform single-qubit rotations, can participate in two-qubit entangling operations, e.g., controlled-NOT (CNOT) gates, can perform a topological version of the Hadamard transformation, e.g., by exchanging their quantum states in a SWAP operation, and can be measured.

The multiple qubits 102 are arranged in an array, e.g., a two dimensional grid 110. For clarity, the two dimensional grid 110 depicted in FIG. 1 includes 11×7=77 qubits, however in some implementations the system 100 may include a smaller or a larger number of qubits.

The multiple qubits 102 interact with each other through multiple qubit couplers. The multiple qubit couplers can define nearest neighbor interactions between data qubits and measure qubits, e.g., such that each data qubit is directly coupled to multiple measure qubits (and is not directly coupled to any other data qubits), and each measure qubit is directly coupled to multiple data qubits (and is not directly coupled to any other measure qubits). The couplers can, in principle, be any type of coupler, e.g., a capacitive or inductive coupler. In some implementations the strengths of the couplers can be controllable, e.g., frequency controllable. In other implementations the couplers can be couplers with a fixed coupling strength.

The control electronics 104 include control devices, e.g., arbitrary waveform generators, that can operate the multiple qubits 102. For example, the control electronics 104 can include control devices that tune operating frequencies of the qubits 102 by applying control signals, e.g., voltage pulses, to the qubits through respective control lines.

As another example, the control electronics 104 can control individual frequencies of the qubits 102 such that the frequency of one or more of the qubits are adjusted towards or away from a frequency of an excitation pulse generated by an excitation pulse generator on an excitation driveline. The excitation pulses can include pulses with frequencies that implement quantum operations, e.g., quantum logic gates. The qubits 102 can be coupled to an excitation driveline via respective couplers. In some cases, the couplers can be capacitive couplers, e.g., realized by a microwave line running adjacent to a qubit capacitor.

The control electronics 104 can also include control devices that tune frequencies of the couplers that couple the multiple qubits 102.

The type of control electronics 104 that the system 100 utilizes is dependent on the type of qubits the system uses. As an example, qubits that are realized via atomic, molecular or solid-state quantum systems typically have energy separation of the relevant qubit levels in the microwave or optical domain. The states of such qubits may be manipulated and controlled using external fields, such as microwave or optical fields. In such cases, as an example, mode-locked lasers may serve as control electronics due to their broadband optical spectra that feature both radio frequency and microwave structure. In another example, the control electronics 104 could include a collection of individual qubit controllers realized by a radio frequency generator as well as one or a collection of global excitation controllers realized by a radio frequency or microwave generator. In both cases, the control electronics 104 can be operated manually or connected to a computer and controlled via suitable software allowing for specifying and automatically running the required qubit operations.

The system 100 can program the control electronics 104 to implement the surface code on the two dimensional grid 110. To implement the surface code, the control electronics 104 repeatedly applies a quantum circuit to some or all of the qubits 102. For example, the control electronics 104 can repeatedly apply the quantum circuit to qubits included in a subset of the multiple qubits 102, e.g., one or more collections of physical qubits that form respective logical qubits. This subset of qubits is referred to as a "code patch". In the example code patch 116 shown in FIG. 1, the yellow squares represent X stabilizers and the green squares represent Z stabilizers, where data qubits exist at the vertices of the stabilizers and measure qubits exist at the center of each stabilizer.

Unlike standard surface code quantum circuits, the presently described surface code quantum circuits allow for movement of the code patch whilst preserving the error detection properties of the surface code. For example, the surface code quantum circuits can allow for a code patch 116 to step diagonally through the two dimensional grid 110, where the direction in which the code patch steps is dependent on the particular circuit decomposition. The movement of the code patch is achieved without additional gate layers. (Although since the code patch moves, additional qubits are required so that the patch can "move into" a new position in the qubit array. However, the code patch remains the same size, no additional spacetime volume is required for the patch.) In addition, the movement of the patch can be used to remove data qubit leakage or to perform logical operations between different (e.g., spatially separated) code patches in the grid.

Figure 2A:
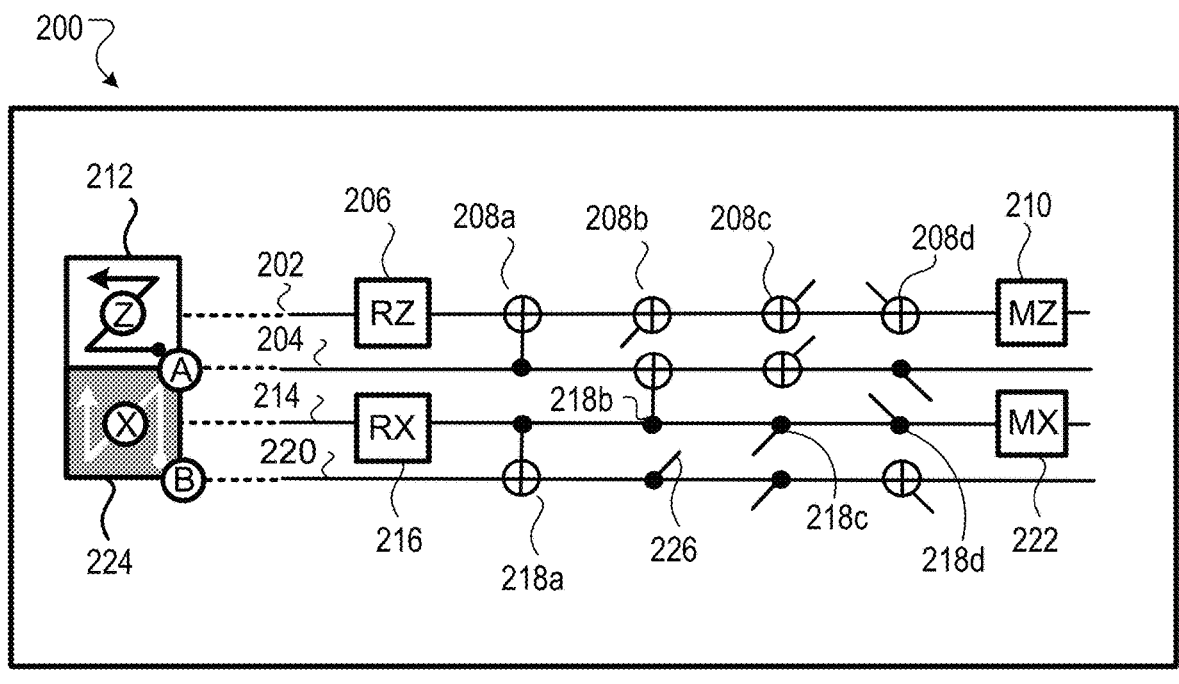
FIG. 2A shows an example quantum circuit for implementing a standard surface code cycle for a measure-Z qubit and a measure-X qubit.

FIG. 2A shows a standard quantum circuit 200 for implementing a surface code cycle. To implement the surface code cycle for a measure-Z qubit 202, the quantum circuit 200 includes a reset operation 206 that initializes the measure-Z qubit 202, e.g., in its ground state.

After the measure-Z qubit 202 has been initialized, multiple CNOT gates are applied to the measure-Z qubit 202. In the example shown in FIG. 2A, the measure-Z qubit 202 is not located at the boundary of the surface code patch, therefore the multiple CNOT gates include four CNOT gates 208a-208c.

The first CNOT gate 208a targets the measure-Z qubit 202, where the neighboring data qubit (A) 204 acts as a control.

The second CNOT gate 208b targets the measure-Z qubit 202, where a different neighboring data qubit acts as a control (as indicated by the diagonal line leaving the target symbol of the CNOT gate 208b).

The third CNOT gate 208c targets the measure-Z qubit 202, where another different neighboring data qubit acts as a control (as indicated by the diagonal line leaving the target symbol of the CNOT gate 208c, where the diagonal line points in a different direction to the diagonal line that leaves the target symbol of the CNOT gate 208b).

The fourth CNOT gate 208d targets the measure-Z qubit 202, where another different neighboring data qubit acts as a control (as indicated by the diagonal line leaving the target symbol of the CNOT gate 208d, where the diagonal line points in a different direction to the diagonal lines that leave the target symbols of the CNOT gates 208b and 208c).

Therefore, in this standard quantum circuit 200 for a measure-Z qubit, the CNOT gates all target the measure qubit where each of the four nearest-neighbor data qubits act as a control for a respective CNOT gate. This property of the CNOT gates is illustrated in box 212, where the zig-zag arrow represents the geometric sequence of operations.

After the CNOT gates 208a-208c have been performed, the measure-Z qubit is measured, e.g., through application of a projective measurement operation 210. A result of the measurement operation is used to detect errors.

To implement the surface code cycle for a measure-X qubit 214, the quantum circuit 200 includes a reset operation 216 that initializes the measure-X qubit 214, e.g., in its ground state.

After the measure-X qubit 214 has been initialized, multiple CNOT gates are applied to the measure-X qubit 214. In the example shown in FIG. 2A, the measure-X qubit 214 is not located at the boundary of the surface code patch, therefore the multiple CNOT gates include four CNOT gates 218a-218c.

The first CNOT gate 218a uses the measure-X qubit 214 as a control and targets the neighboring data qubit (B) 220.

The second CNOT gate 218b uses the measure-X qubit 214 as a control and targets a different neighboring data qubit, data qubit 204.

The third CNOT gate 218c uses the measure-X qubit 214 as a control and targets another different neighboring data qubit (as indicated by the diagonal line leaving the control symbol of the CNOT gate 218c).

The fourth CNOT gate 218d targets the measure-X qubit 214, where another different neighboring data qubit acts as a control (as indicated by the diagonal line leaving the control symbol of the CNOT gate 218d, where the diagonal line points in a different direction to the diagonal line that leaves the control symbol of the CNOT gate 218c).

Therefore, in this standard quantum circuit 200 for a measure-X qubit, the CNOT gates all use the measure qubit as a control, where each of the four nearest-neighbor data qubits are targets for a respective CNOT gate. This property of the CNOT gates is illustrated in box 224, where the zig-zag arrow represents the geometric sequence of operations (and has a different orientation than the zig-zag arrow in box 212, to indicate that the CNOT gates 218a-d are performed in different directions and between different pairs of qubits).

Although not shown in FIG. 2A, the standard quantum circuit 200 for a measure-X qubit can also include Hadamard gates that are applied to the measure-X qubit before and after CNOT gates 218a-d are performed.

After the CNOT gates 218a-218c have been performed, the measure-X qubit is measured, e.g., through application of a projective measurement operation 222. A result of the measurement operation is used to detect errors.

Other quantum gates shown in the standard quantum circuit 200 correspond to gates that are applied between other pairs of data and measure qubits. For example, CNOT gate 226 can correspond to a CNOT operation performed between the data qubit 220 and another measure-X qubit, where the other measure-X qubit is not shown and is the target of the CNOT gate 226.

Application of the measurement operations 210 and 222 completes the surface code cycle, and application of the quantum circuit 200 can be repeated to perform subsequent surface code cycles.

Figure 2B:
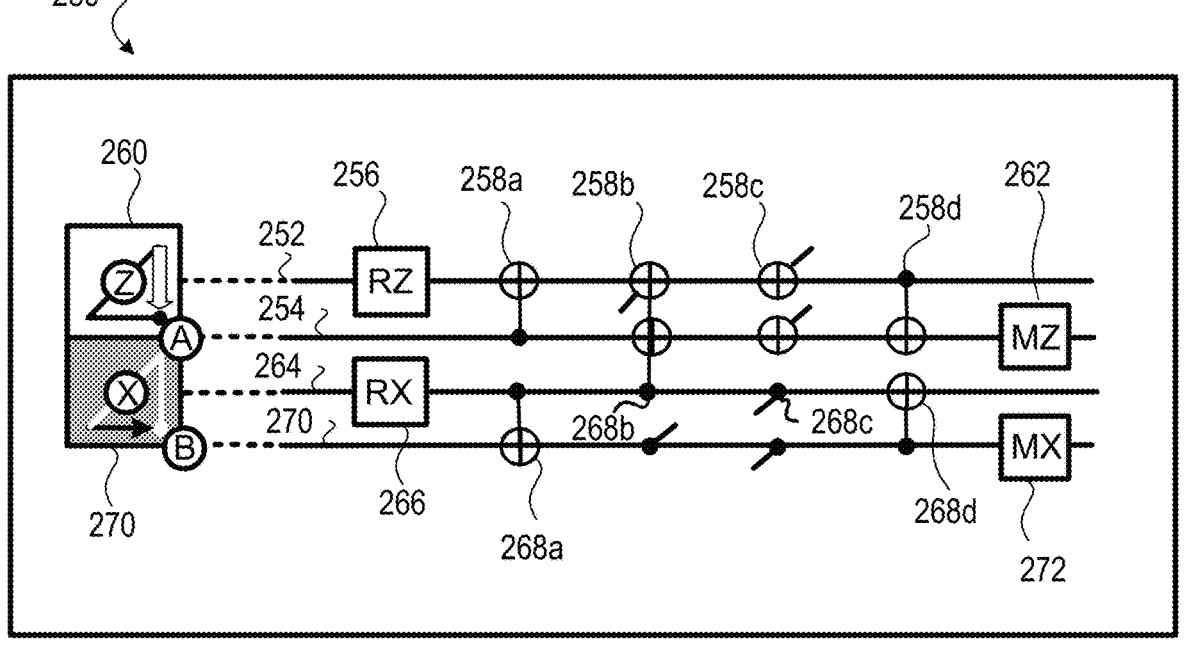
FIG. 2B shows an example quantum circuit for implementing the presently described stepped surface code cycle for a measure-Z qubit and a measure-X qubit.

FIG. 2B shows an example quantum circuit 250 for implementing a stepped surface code cycle, i.e., a surface code cycle that moves the surface code patch. To implement the stepped surface code cycle for a measure-Z qubit 252, the quantum circuit 250 includes a reset operation 256 that initializes the measure-Z qubit 252, e.g., in its ground state.

After the measure-Z qubit 252 has been initialized, multiple CNOT gates are applied to the measure-Z qubit 252. In the example shown in FIG. 2B, the measure-Z qubit 252 is not located at the boundary of the surface code patch, therefore the multiple CNOT gates include four CNOT gates 258a-258d.

The first CNOT gate 258a targets the measure-Z qubit 252, where the neighboring data qubit (A) 254 acts as a control.

The second CNOT gate 258b targets the measure-Z qubit 252, where a different neighboring data qubit acts as a control (as indicated by the diagonal line leaving the target symbol of the CNOT gate 258b).

The third CNOT gate 258c targets the measure-Z qubit 252, where another different neighboring data qubit acts as a control (as indicated by the diagonal line leaving the target symbol of the CNOT gate 258c, where the diagonal line points in a different direction to the diagonal line that leaves the target symbol of the CNOT gate 258b).

Unlike the fourth CNOT gate 208d in quantum circuit 200, the fourth CNOT gate 258d uses the measure-Z qubit 252 as a control and targets the data qubit 254. Therefore, in the presently described quantum circuit 250 for a measure-Z qubit, only three CNOT gates target the measure qubit, where three nearest-neighbor data qubits act as a control for a respective CNOT gate. The fourth CNOT gate targets a data qubit and uses the measure qubit as a control (the fourth CNOT gate reverses the roles of the target and control). In addition, the fourth CNOT gate is also between the measure-Z qubit and the data qubit 254. This property of the CNOT gates 258a-d is illustrated in box 260, where the arrow that represents the geometric sequence of operations returns to the start point instead of zig-zagging to another direction.

By construction, after the CNOT gates 258a-258c have been performed, the roles of the underlying qubits (e.g., the functional types) have been exchanged. Therefore, the data qubit 254 is measured, e.g., through application of a projective measurement operation 262, to obtain measurement results for error detection.

To implement the surface code cycle for a measure-X qubit 264, the quantum circuit 250 includes a reset operation 266 that initializes the measure-X qubit 264, e.g., in its ground state.

After the measure-X qubit 264 has been initialized, multiple CNOT gates are applied to the measure-X qubit 264. In the example shown in FIG. 2B, the measure-X qubit 264 is not located at the boundary of the surface code patch, therefore the multiple CNOT gates include four CNOT gates 268a-268d.

The first CNOT gate 268a uses the measure-X qubit 264 as a control and targets the neighboring data qubit (B) 270.

The second CNOT gate 268b uses the measure-X qubit 264 as a control and targets a different neighboring data qubit, data qubit 254.

The third CNOT gate 268c uses the measure-X qubit 264 as a control and targets another different neighboring data qubit (as indicated by the diagonal line leaving the control symbol of the CNOT gate 268c).

Unlike the fourth CNOT gate 218d in quantum circuit 200, the fourth CNOT gate 268d targets the measure-X qubit 264 and uses the data qubit 270 as a control. Therefore, in the presently described quantum circuit 250 for a measure-X qubit, only three CNOT gates use the measure-X qubit as a control, where three nearest-neighbor data qubits are targets for respective CNOT gates. The fourth CNOT gate uses a data qubit as a control, where the measure qubit is the target (the fourth CNOT gate reverses the roles of the target and control). In addition, the fourth CNOT gate is also between the measure-X qubit and the data qubit 270. This property of the CNOT gates 268a-d is illustrated in box 270, where the arrow that represents the geometric sequence of operations returns to the start point instead of zig-zagging to another direction.

Although not shown in FIG. 2B, the presently described quantum circuit 250 for a measure-X qubit can also include Hadamard gates that are applied to the measure-X qubit before and after CNOT gates 268a-d are performed.

As described above, by construction, after the CNOT gates 268a-268c have been performed, the roles of the underlying qubits (e.g., the functional types) have been exchanged. Therefore, the data qubit 270 is measured, e.g., through application of a projective measurement operation 272, to obtain measurement results for error detection.

As in quantum circuit 200, other quantum gates shown in the quantum circuit 250 correspond to gates that are applied between other pairs of data and measure qubits.

Application of the measurement operations 262 and 272 completes the stepped surface code cycle, and application of the quantum circuit 250 can be repeated to perform subsequent stepped surface code cycles, e.g., to move the surface code patch in a pattern as described below with reference to FIG. 4.

FIG. 3 is a flowchart of an example process 300 for performing a stepped surface code cycle. For clarity, example process 300 is described with reference to performing a stepped surface code cycle on one measure qubit and its four neighboring data qubits. However, example process 300 can be performed (in parallel) for each of multiple measure qubits (and their neighboring data qubits) included in a surface code patch, e.g., included in one or more logical qubits. For convenience, the process 300 will be described as being performed by components of a quantum computing system. For example, classical control electronics in communication with an array of qubits, e.g., the control electronics 104 of FIG. 1, appropriately programmed, can perform example process 300.

The system applies a reset operation to the measure qubit (step 302). Application of the reset operation initializes the measure qubit, e.g., in its ground state.

The system applies a first CNOT gate to the measure qubit and a first data qubit, where the first data qubit is coupled to the measure qubit in a first direction (step 304). The first CNOT gate targets one of the measure qubits and the first data qubit. For example, in implementations where the measure qubit is a measure-Z qubit, the first CNOT gate targets the measure qubit and uses the first data qubit as a control. In implementations where the measure qubit is a measure-X qubit, the first CNOT gate uses the measure qubit as a control and targets the first data qubit.

In the present disclosure applying a CNOT gate can include applying a set of quantum operations that has the effect of performing a CNOT operation, e.g., where the set of operations depends on the specific quantum hardware being used to perform the quantum computations. For example, in some implementations the system can apply a CNOT gate indirectly using combinations of CZ gates and Hadamard gates.

The system applies a second CNOT gate to the measure qubit and a second data qubit, where the second data qubit is coupled to the measure qubit in a second direction that is different to the first direction (step 306). In implementations where the measure qubit is a measure-Z qubit, the second CNOT gate targets the measure qubit and uses the second data qubit as a control. In implementations where the measure qubit is a measure-X qubit, the second CNOT gate uses the measure qubit as a control and targets the second data qubit.

The system applies a third CNOT gate to the measure qubit and a third data qubit, where the third data qubit is coupled to the measure qubit in a third direction that is different to both the first direction and the second direction (step 308). In implementations where the measure qubit is a measure-Z qubit, the third CNOT gate targets the measure qubit and uses the third data qubit as a control. In implementations where the measure qubit is a measure-X qubit, the third CNOT gate uses the measure qubit as a control and targets the third data qubit. Therefore, in either case each of the first CNOT gate, second CNOT gate, and third CNOT gate target a qubit with a same functional type, e.g., each targets the measure qubit or each targets the a data qubit.

The system applies a fourth CNOT gate to the measure qubit and the first data qubit, where the fourth CNOT gate targets another of the measure qubit and the first data qubit, e.g., a qubit with a functional type that is different to the functional type of the qubit targeted by each of the first, second, and third CNOT gates (step 310). For example, in implementations where the measure qubit is a measure-Z qubit, the first, second, and third CNOT gates target the measure qubit and uses the first, second and third data qubits as a control respectively, whereas the fourth CNOT gate targets the first data qubit and uses the measure qubit as a control. Similarly, in implementations where the measure qubit is a measure-X qubit, the first, second, and third CNOT gate uses the measure qubit as a control and targets the first, second and third data qubit respectively, whereas the fourth CNOT gate uses the first data qubit as a control and targets the measure qubit.

By construction, performing steps 304-310 transfers information stored by the measure qubit, first data qubit, second data qubit, third data qubit, and fourth data qubit to other qubits in the two-dimensional grid so as to logically move the measure qubit, first data qubit, second data qubit, third data qubit, and fourth data qubit collectively and in a same direction, e.g., diagonally by one grid cell in the two-dimensional grid. The diagonal direction is dependent on the direction of the coupling between the measure qubit and the first data qubit, e.g., the data qubit that the measure qubit interacts twice with during the stepped surface code cycle.

Therefore, after steps 304-310 are performed, the functional type of each of the measure qubit, first data qubit, second data qubit, third data qubit, and fourth data qubit is exchanged. The information previously stored by the measure qubit is stored in a data qubit and vice versa. Therefore, to obtain measurement results for error detection the system measures the first data qubit (step 312). Measuring the first data qubit removes qubit leakage that had accumulated on the measure qubit during the stepped surface code cycle.

As described above, in some implementations the measure qubit, first data qubit, second data qubit, third data qubit, and fourth data qubit form a respective stabilizer in a logical qubit, where the logical qubit includes multiple stabilizers. In these implementations the system can perform the stepped surface code cycle on each of the multiple stabilizers, e.g., to a surface code patch.

Figure 6A:
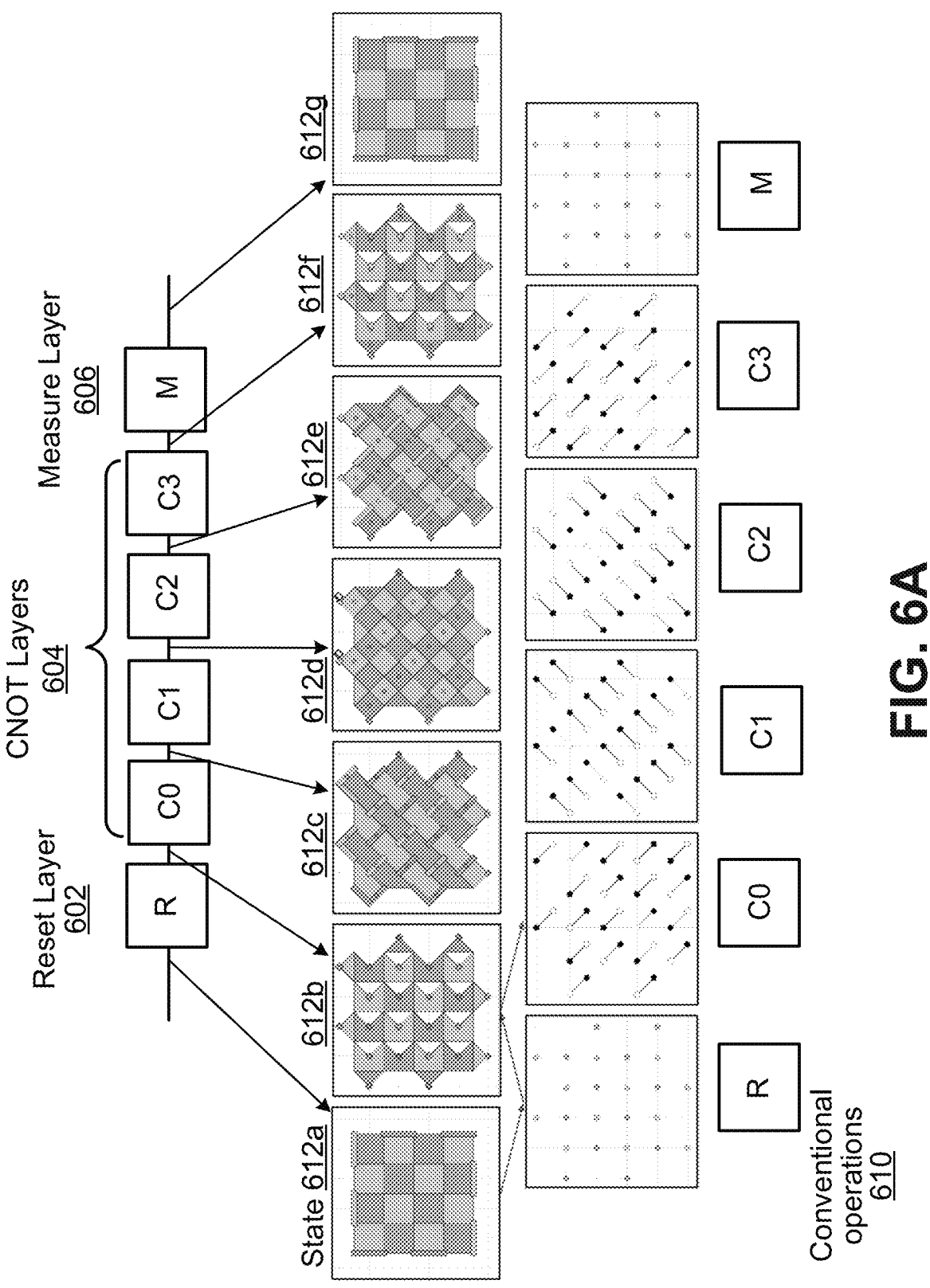
FIGS. 6A and 6B show illustrations that compare operations performed during a conventional surface code cycle and example operations performed during a stepped surface code cycle.
Figure 6B:
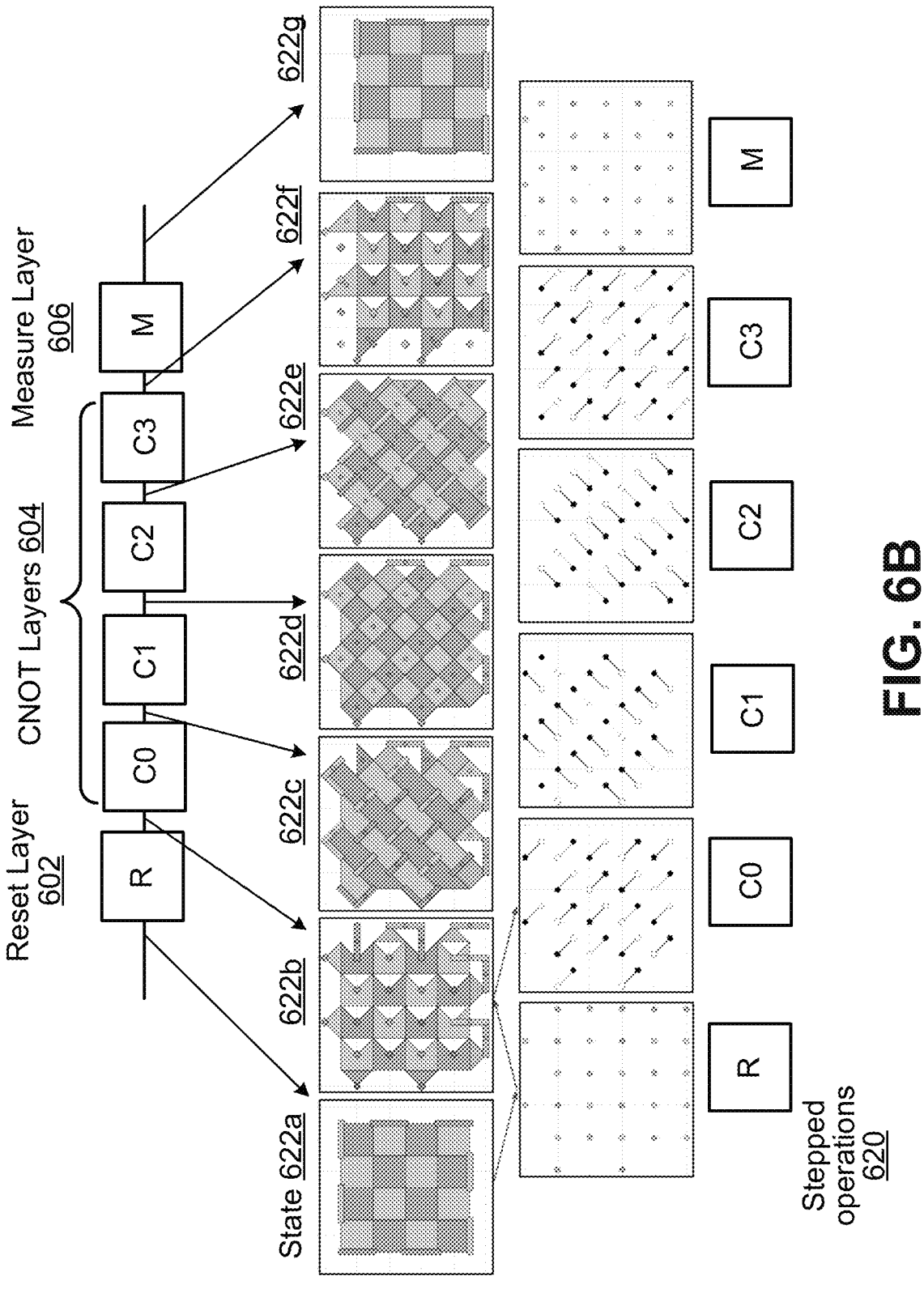

As a surface code patch is moved using the techniques described herein, the boundaries of the patch must also move. This involves introducing additional boundary stabilizers on qubits the patch is moving toward and performing a terminal measurement of boundary stabilizers on qubits the patch is moving away from. In order not to compromise the code distance, the newly introduced stabilizers should, after each gate, preserve the structure of the code. That is, commute with other stabilizers and not touch two stabilizers that are otherwise not both touched by another single stabilizer. Therefore, in implementations where example process 300 is performed to move a surface code patch of multiple stabilizers, the system can perform steps 302-312 to stabilizers in the bulk of the code patch (e.g., stabilizers that are not at the boundary) and, for each stabilizer at a boundary that the code patch is moving away from, measure the stabilizer. The system can further introduce new stabilizers at a boundary that the code patch is moving towards, the system can perform steps that are similar to steps 302-312 of example process 300, with the exception that the number and type of entangling operations performed at steps 304-310 are adjusted to preserve the structure of the code. An example of a pattern of stabilizers to be introduced and terminally measured is shown in FIGS. 6A and 6B. This pattern follows the code structure constraints and preserve the code distance.

In some implementations the system can perform subsequent stepped surface code cycles, e.g., repeatedly perform example process 300, to move the measure qubit, first data qubit, second data qubit, third data qubit, and fourth data qubit (or generally a surface code patch) in different directions or through the two-dimensional grid. Example surface code patch movements enabled by the presently described quantum circuit construction are described below with reference to FIG. 4.

Figure 4:
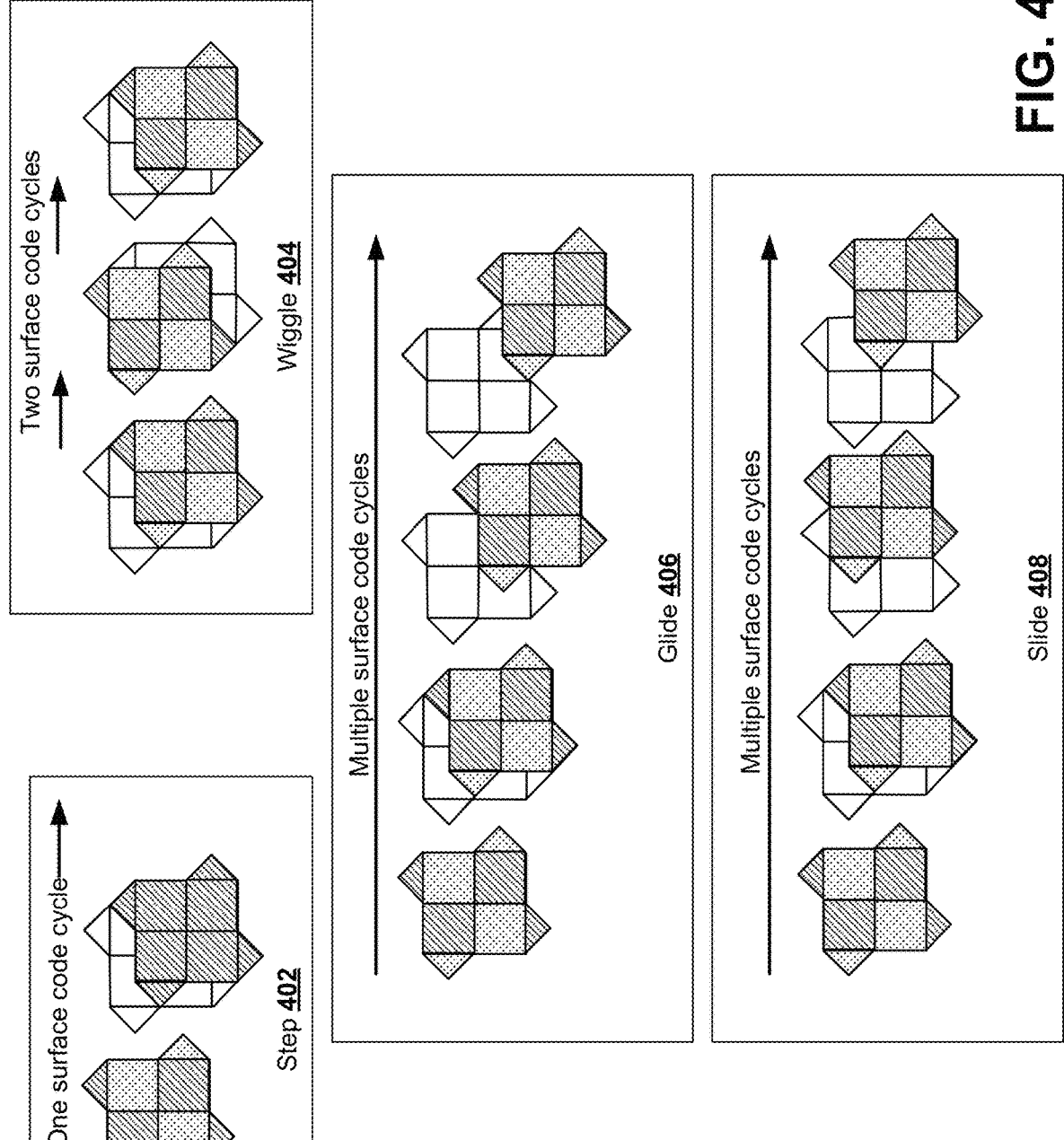
FIG. 4 shows example surface code patch movements enabled by the presently described quantum circuit construction.

FIG. 4 shows example surface code patch movements enabled by the presently described quantum circuit construction. A first example surface code patch movement is a "step" 402. As described above with reference to FIG. 3, by construction, performing one stepped surface code cycle on a measure qubit and its neighboring data qubits logically and collectively moves the measure qubit and the data qubits diagonally by one grid cell in the two-dimensional grid. Therefore, when applied to all measure and data qubits included in a surface code patch, the whole surface code patch steps diagonally by one grid cell in the two-dimensional grid, as shown in box 402. As described above with reference to FIG. 1, the shaded squares in the code patch represent X or Z stabilizers, where data qubits exist at the vertices of the stabilizers and measure qubits exist at the center of each stabilizer. Therefore, after the code patch has stepped diagonally by one grid cell the data qubits that previously existed at a vertex of the underlying grid now exist at center of a grid cell (and vice versa). Therefore, the functional types (or roles) of the qubits have been exchanged.

Another example surface code patch movement is a "wiggle" 404 which moves the code patch back and forth from an initial position. A wiggle movement can be achieved by applying a first stepped surface code cycle to the qubits in the code patch to perform a "step", then applying a second stepped surface code cycle to the qubits in the code patch to step the qubits back to their initial position in the grid. To logically return the code patch to the initial position, the direction in which the code patch moves in the second stepped surface code cycle is opposite to the direction in which the code patch moved in the first stepped surface code cycle (which, due to the rotational symmetry of the surface code, can be achieved through appropriate rotation of the quantum circuit).

Because one "step" exchanges the functional types (or roles) of the qubits and the measure and initialize operations performed on the qubits in the code patch removes leakage accumulated on the measure qubits, "wiggling" the code patch in this manner can be used to remove leakage accumulated on the data qubits. For example, repeatedly exchanging roles permits all individual qubits to have their leakage removed every 2nd code cycle, when they are playing the role of measure qubit. This leakage removal can be achieved without adding any additional gates to the surface code cycle.

Another example surface code patch movement is a "glide" 406 in which the code patch collectively and logically moves diagonally (in a same direction) by multiple grid cells through the grid. This gliding behavior can be achieved by performing multiple stepped surface code cycles (where the direction of the step stays the same).

Another example surface code patch movement is a "slide" 408 in which the code patch collectively and logically moves laterally by multiple grid cells through the grid. This sliding behavior can be achieved by performing multiple stepped surface code cycles, where the stepped surface code cycles alternate between a first surface code cycle that collectively moves the code patch in a first diagonal direction and a second surface code cycle that collectively moves the code patch in a second diagonal direction that is perpendicular to the first diagonal direction, i.e., the code patch zig zags through the grid. The gliding and sliding movements can be used to barrel shift registers of logical qubits, as described below with reference to FIG. 7.

Figure 5:
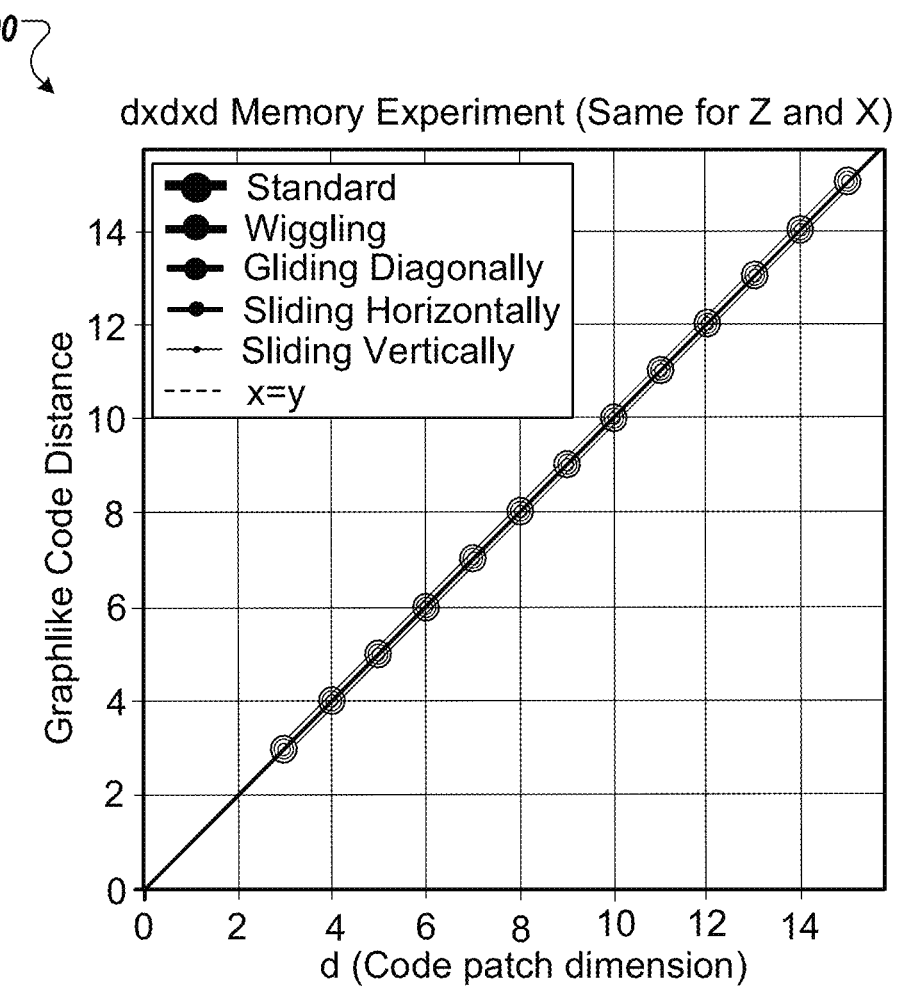
FIG. 5 is a graph that compares the performance of the example surface code patch movements enabled by the presently described quantum circuit construction.

FIG. 5 is a graph 500 that compares the performance of the example surface code patch movements enabled by the presently described quantum circuit construction. The graph 500 includes an x axis that represents the code patch dimension d and a y axis that represents the graph like code distance, which is a metric that quantifies the error-correcting capabilities of a code. An effective code of this type should show a 1-to-1 relationship between the patch size and the graph like code distance, e.g., should follow the dashed line. The different cases shown include: the standard code circuit and various versions of the presently described stepped or moving code, e.g., wiggling, gliding diagonally, sliding horizontally, and sliding vertically. As shown, all examples are 1-to-1, indicating an effective and correct code construction.

FIGS. 6A and 6B show illustrations that compare example operations performed during a conventional surface code cycle 610 and example operations performed during a stepped surface code cycle 620. The operations are described with reference to a surface code patch that includes 24 stabilizers, however this is for illustrative purposes only and the surface code patch can include fewer or more stabilizers.

Referring to FIG. 6A, a standard surface code cycle includes a layer of reset operations "R" 602 that are applied to measure qubits in the surface code patch, a layer of CNOT gates "C0-C3" 604 that are applied between the measure qubits in the surface code patch and their respective neighboring data qubits, and a layer of measurement operations "M" 606 that are applied to the measure qubits in the surface code patch to obtain measurement results, e.g., syndromes, for error detection.

States 612*a*-*g* illustrate the states of the stabilizers after the operations R, C0-C3, and M have been applied, respectively. In each illustration 612*a*-*g*, the stabilizers are represented by the different contracting and expanding shapes (which is standard notation in the field of quantum error correction).

In the example operations performed during a conventional surface code cycle 610, the layer of reset operations "R" reset alternating measure qubits in the X and Z basis. The layers of CNOT operations "C0-C3" each apply CNOT operations (where black circles represent control qubits and white circles represent target qubits) to the measure qubits and neighboring data qubits, such that after layer C3 has been applied, each measure qubit in the bulk has performed a CNOT gate with each of its neighboring qubits. The layer of measurement operations "M" then measures the alternating measure qubits in the X and Z basis.

Referring to FIG. 6B, in the example operations performed during the presently described stepped surface code cycle 620, the layer of reset operations "R" reset alternating measure qubits in the X and Z basis. This layer is similar to the layer of reset operations performing the conventional operations 610. However, the layers of CNOT operations "C0-C3" in the stepped operations 620 are different to the layers of CNOT operations "C0-C3" in the conventional operations 610. For example, targets and controls of the CNOT operations have been exchanged in C3, stabilizers at the boundary that the code patch is moving away from have been measured, and stabilizers at the boundary that the code patch is moving toward perform operations to follow code structure constraints and preserve the code distance.

The layer of measurement operations "M" in the stepped operations 620 are also similar to layer of measurement operations performed in the conventional operations 610, except that since the stepped surface code cycle steps the code patch diagonally by one grid cell, the measurement operations are performed on data qubits instead of measure qubits.

As in FIG. 6A, states 612*a*-*g* illustrate the states of the stabilizers after the operations R, C0-C3, and M have been applied, respectively.

FIG. 7 illustrates an application of the presently described quantum circuit construction to shift a register of logical qubits, e.g., register 702. Shifting a register of logical qubits is a common circuit primitive in quantum computing, for example in algorithms using carry-adder circuits, queues and stacks, and further is useful in relocating logical qubits away from a part of the device that is suffering from degraded performance or requires recalibration.

Conventional techniques 700 for shifting a register of logical qubits are currently expensive and require a total volume 704 (in $d^3$) of $N(N+S)=N^2+NS$, where N represents the register length and S represents the shift distance. This cost is due to the necessity to maintain code distance without requiring additional space, requiring that each logical qubit is moved into its final position one-by-one.

This total volume (in $d^3$) can be reduced using the presently described techniques, e.g., performing multiple stepped surface code cycles to each stabilizer in each logical qubit in the register to logically shift (or "glide") the logical qubits diagonally by multiple grid cells in the qubit array, as described above with reference to FIG. 4. In particular, the total volume 706 (in $d^3$) can be reduced to 2NS and therefore the register can be shifted at a lower cost.

Figure 8:
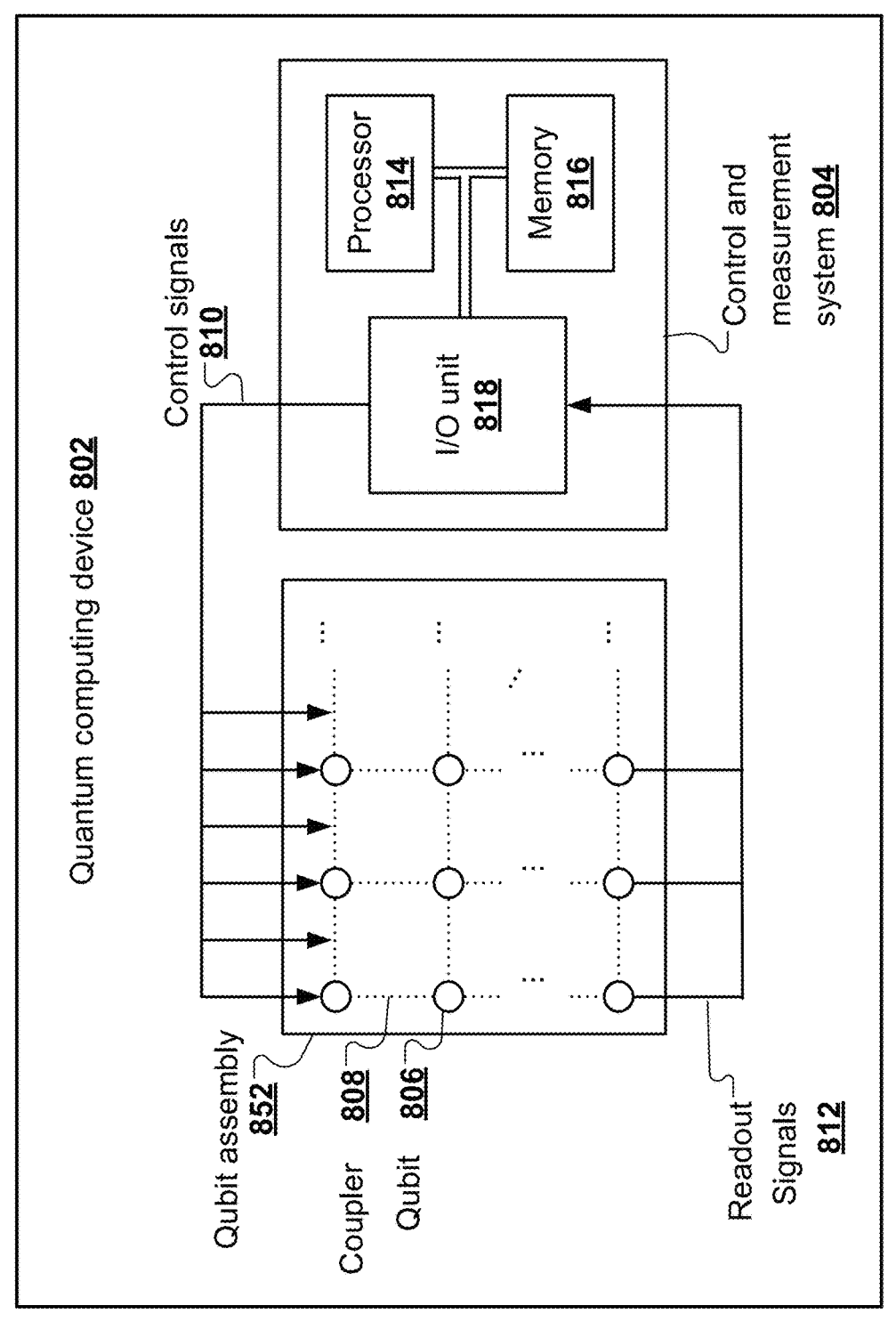
FIG. 8 depicts an example quantum computer.

FIG. 8 depicts an example quantum computer 800 for performing the quantum operations described in this specification. The example quantum computer 800 includes an example quantum computing device 802. The quantum computing device 802 is intended to represent various forms of quantum computing devices. The components shown here, their connections and relationships, and their functions, are exemplary only, and do not limit implementations of the inventions described and/or claimed in this document.

The example quantum computing device 802 includes a qubit assembly 852 and a control and measurement system 804. The qubit assembly includes multiple qubits, e.g., qubit 806, that are used to perform algorithmic operations or quantum computations. While the qubits shown in FIG. 8 are arranged in a rectangular array, this is a schematic depiction and is not intended to be limiting. The qubit assembly 852 also includes adjustable coupling elements, e.g., coupler 808, that allow for interactions between coupled qubits. In the schematic depiction of FIG. 8, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a physical two-level quantum system or device having levels representing logical values of 0 and 1. The specific physical realization of the multiple qubits and how they interact with one another is dependent on a variety of factors including the type of the quantum computing device 802 included in the example computer 800 or the type of quantum computations that the quantum computing device is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by loading qubits, e.g., from a quantum memory, and applying a sequence of unitary operators to the qubits. Applying a unitary operator to the qubits can include applying a corresponding sequence of quantum logic gates to the qubits, e.g., to implement the surface code circuits described in this specification. Example quantum logic gates include single-qubit gates, e.g., Pauli-X, Pauli-Y, Pauli-Z (also referred to as X, Y, Z), Hadamard gates, S gates, rotations, two-qubit gates, e.g., controlled-X, controlled-Y, controlled-Z (also referred to as CX, CY, CZ), controlled NOT gates (also referred to as CNOT) controlled swap gates (also referred to as CSWAP), iSWAP gates, and gates involving three or more qubits, e.g., Toffoli gates. The quantum logic gates can be implemented by applying control signals 810 generated by the control and measurement system 804 to the qubits and to the couplers.

For example, in some implementations the qubits in the qubit assembly 852 can be frequency tunable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 810 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as X or Z, using respective control signals 810. The measurements cause readout signals 812 representing measurement results to be communicated back to the measurement and control system 804. The readout signals 812 may include RF, microwave, or optical signals depending on the physical scheme for the quantum computing device and/or the qubits. For convenience, the control signals 810 and readout signals 812 shown in FIG. 8 are depicted as addressing only selected elements of the qubit assembly (i.e., the top and bottom rows), but during operation the control signals 810 and readout signals 812 can address each element in the qubit assembly 852.

The control and measurement system 804 is an example of a classical computer system that can be used to perform various operations on the qubit assembly 852, as described above, as well as other classical subroutines or computations. The control and measurement system 804 includes one or more classical processors, e.g., classical processor 814, one or more memories, e.g., memory 816, and one or more I/O units, e.g., I/O unit 818, connected by one or more data buses. The control and measurement system 804 can be programmed to send sequences of control signals 810 to the qubit assembly, e.g., to carry out a selected series of quantum gate operations, and to receive sequences of readout signals 812 from the qubit assembly, e.g., as part of performing measurement operations.

The processor 814 is configured to process instructions for execution within the control and measurement system 804. In some implementations, the processor 814 is a single-threaded processor. In other implementations, the processor 814 is a multi-threaded processor. The processor 814 is capable of processing instructions stored in the memory 816.

The memory 816 stores information within the control and measurement system 804. In some implementations, the memory 816 includes a computer-readable medium, a volatile memory unit, and/or a non-volatile memory unit. In some cases, the memory 816 can include storage devices capable of providing mass storage for the system 804, e.g., a hard disk device, an optical disk device, a storage device that is shared over a network by multiple computing devices (e.g., a cloud storage device), and/or some other large capacity storage device.

The input/output device 818 provides input/output operations for the control and measurement system 804. The input/output device 818 can include D/A converters, A/D converters, and RF/microwave/optical signal generators, transmitters, and receivers, whereby to send control signals 810 to and receive readout signals 812 from the qubit assembly, as appropriate for the physical scheme for the quantum computer. In some implementations, the input/output device 818 can also include one or more network interface devices, e.g., an Ethernet card, a serial communication device, e.g., an RS-232 port, and/or a wireless interface device, e.g., an 802.11 card. In some implementations, the input/output device 818 can include driver devices configured to receive input data and send output data to other external devices, e.g., keyboard, printer and display devices.

Although an example control and measurement system 804 has been depicted in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively, or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a quantum computer, the method comprising:
   performing a first surface code cycle in a system comprising a plurality of qubits, wherein each qubit in the plurality of qubits is one of two functional types, the two functional types comprising measure qubits and data qubits, wherein performing the first surface code cycle comprises:
       applying a first controlled NOT (CNOT) gate to a measure qubit and a first data qubit, wherein the first data qubit is coupled to the measure qubit in a first direction and the first CNOT gate targets one of the measure qubits and the first data qubit; and
       applying a second CNOT gate to the measure qubit and the first data qubit, wherein the second CNOT gate targets another of the measure qubit and the first data qubit;
   wherein performing the first surface code cycle transfers information stored by the measure qubit and information stored by the first data qubit to other qubits in the plurality of qubits to logically move the measure qubit and the first data qubit.

2. The method of claim 1, wherein the measure qubit and first data qubit are logically moved such that the functional type of the measure qubit and first data qubit is exchanged.

3. The method of claim 1, wherein performing the first surface code cycle further comprises:
   applying a third CNOT gate to the measure qubit and a second data qubit, wherein the second data qubit is coupled to the measure qubit in a second direction that is different to the first direction;
   applying a fourth CNOT gate to the measure qubit and a third data qubit, wherein the third data qubit is coupled to the measure qubit in a third direction that is different to both the first direction and the second direction, wherein each of the first CNOT gate, third CNOT gate, and fourth CNOT gate targets a qubit with a same functional type.

4. The method of claim 3, wherein performing the first surface code cycle transfers information stored by the measure qubit, first data qubit, second data qubit, third data qubit, and fourth data qubit to other qubits in the plurality of qubits to logically move the measure qubit, first data qubit, second data qubit, third data qubit, and fourth data qubit such that the functional type of each of the measure qubit, first data qubit, second data qubit, third data qubit, and fourth data qubit is exchanged.

5. The method of claim 1, wherein performing the first surface code cycle further comprises:
   prior to applying the first CNOT gate, applying a reset operation to a measure qubit in the system, wherein the measure qubit is coupled to neighboring data qubits through respective qubit couplers; and
   after applying the second CNOT gate, measuring the first data qubit to detect errors.

6. The method of claim 1, wherein performing the first surface code cycle removes measure qubit leakage.

7. The method of claim 1, wherein the plurality of qubits are arranged as a two-dimensional grid and wherein performing the first surface code cycle logically moves the measure qubit and the first data qubit diagonally by one grid cell in the two-dimensional grid.

8. The method of claim 1, wherein the measure qubit and the first data qubit are moved collectively and in a same direction, wherein the same direction is dependent on the first direction.

9. The method of claim 7, wherein prior to performing the first surface code cycle, the measure qubit and the first data qubit are at an initial position in the two-dimensional grid, and wherein the method further comprises performing a second surface code cycle to logically return the measure qubit and the first data qubit to the initial position.

10. The method of claim 9, wherein performing the second surface code cycle removes data qubit leakage.

11. The method of claim 7, further comprising performing multiple repetitions of the first surface code cycle to logically move the measure qubit and the first data qubit diagonally by multiple grid cells in the two-dimensional grid.

12. The method of claim 11, wherein the measure qubit and the first data qubit are moved collectively and in a same direction, wherein the same direction is dependent on the first direction.

13. The method of claim 7, further comprising performing multiple subsequent surface code cycles to logically move the measure qubit and the first data qubit laterally by multiple grid cells in the two-dimensional grid.

14. The method of claim 13, wherein logically moving the measure qubit and the first data qubit laterally by multiple grid cells comprises alternating performing the first surface code cycle to collectively move the measure qubit and the first data qubit in a first diagonal direction and a second surface code cycle to collectively move the measure qubit and the first data qubit in a second diagonal direction that is perpendicular to the first diagonal direction.

15. The method of claim 3, wherein the measure qubit, first data qubit, second data qubit, third data qubit, and fourth data qubit form a respective stabilizer in a logical qubit, the logical qubit comprising multiple stabilizers, and wherein the method further comprises performing the first surface code cycle on each of the multiple stabilizers.

16. The method of claim 15, wherein the method further comprises:
   for each stabilizer at a boundary that the code patch is moving away from, measuring the stabilizer; and
   introducing new stabilizers at a boundary that the code patch is moving towards, wherein the new stabilizers preserve the surface code structure.

17. The method of claim 15, wherein the system comprises a register of logical qubits, and wherein the method further comprises performing multiple subsequent surface code cycles to each stabilizer in each logical qubit in the register to logically shift the register in the two-dimensional grid.

18. The method of claim 3, wherein i) the measure qubit is a measure-Z qubit, ii) the first CNOT gate, third CNOT gate, and fourth CNOT gate target the measure qubit, and iii) the second CNOT gate targets the first data qubit.

19. The method of claim 3, wherein i) the measure qubit is a measure-X qubit, ii) the first CNOT gate, third CNOT gate, and fourth CNOT gate target the first data qubit, second data qubit, and third data qubit, respectively, and iii) the second CNOT gate targets the measure qubit.

20. A quantum computing apparatus comprising:

a plurality of qubits, wherein each qubit in the plurality of qubits is one of two functional types, the two functional types comprising measure qubits and data qubits;

qubit couplers defining nearest neighbor interactions between the plurality of qubits; and control electronics configured to operate the plurality of qubits and qubit couplers, wherein the control electronics are configured to perform operations for implementing a first surface code cycle, the operations comprising:

performing a first surface code cycle in a system comprising a plurality of qubits, wherein each qubit in the plurality of qubits is one of two functional types, the two functional types comprising measure qubits and data qubits, wherein performing the first surface code cycle comprises:

applying a first controlled NOT (CNOT) gate to a measure qubit and a first data qubit, wherein the first data qubit is coupled to the measure qubit in a first direction and the first CNOT gate targets one of the measure qubits and the first data qubit; and applying a second CNOT gate to the measure qubit and the first data qubit, wherein the second CNOT gate targets another of the measure qubit and the first data qubit;

wherein performing the first surface code cycle transfers information stored by the measure qubit and information stored by the first data qubit to other qubits in the plurality of qubits to logically move the measure qubit and the first data qubit.

\* \* \* \* \*